United States Patent [19]
Maeda et al.

[11] Patent Number: 6,109,635
[45] Date of Patent: Aug. 29, 2000

[54] AXLE FASTENING DEVICE

[75] Inventors: Tadayuji Maeda; Kazuhiko Gogo, both of Saitama, Japan

[73] Assignee: Honda Giken Kogyo Kabushiki Kaisha, Tokyo, Japan

[21] Appl. No.: 09/231,363

[22] Filed: Jan. 13, 1999

[30] Foreign Application Priority Data

Jan. 13, 1998 [JP] Japan .................................. 10-005165

[51] Int. Cl.⁷ .................................................. B62K 25/04
[52] U.S. Cl. .......................... 280/279; 280/276; 280/277; 301/110.5
[58] Field of Search .................................. 280/279, 276, 280/277; 301/110.5

[56] References Cited

U.S. PATENT DOCUMENTS

| 3,971,571 | 7/1976 | Yoshioka ................................... 280/276 |
| 5,653,512 | 8/1997 | Phillips .................................... 301/110.5 |

FOREIGN PATENT DOCUMENTS

| 62733 | 7/1891 | Germany ............................. 301/110.5 |
| 416260 | 11/1946 | Italy ....................................... 280/277 |
| 4-18089 U | 2/1992 | Japan . |
| 15591 | 4/1903 | Sweden ............................... 301/110.5 |

*Primary Examiner*—Kevin Hurley
*Assistant Examiner*—Elaine Gort
*Attorney, Agent, or Firm*—Birch, Stewart, Kolasch & Birch, LLP

[57] ABSTRACT

To enable the positioning of an axle nut with a clamp. A split clamp axle holder is provided on each of the lower portions of left and right front forks of a motorcycle. The ends of an axle of the motorcycle are respectively fastened to the axle holders. The axle holder which supports a threaded small diameter portion of the axle has a peripheral groove extending in a radial direction from an axle opening. An axle nut is locked inside the axle opening by tightening clamp parts positioned on both ends of a slot formed in the axle holder with a bolt. One end of the axle nut includes a collar part and the other end includes a peripheral groove. A central part of the axle nut includes a cylindrical part which is inserted into the axle opening with the side having the peripheral groove entering first. By engaging a circlip in the peripheral groove protruding from the other end of the axle nut, it is possible to properly locate the axle nut on the axle holder. The small diameter part of the axle includes a screw part which can be secured to a screw part formed on the inside the axle holder.

20 Claims, 6 Drawing Sheets

AXLE FASTENING DEVICE

BACKGROUND OF THE INVENTION

1. Field of the Invention

This invention relates to a device for clamping an axle which supports the front wheel to the front forks of a 2-wheeled vehicle.

2. Description of Related Art

Japanese Patent Laid-open No. Hei 4-18089 is an example of this kind of device. In this example, an axle holder is provided on each of the lower parts of a pair of left and right front forks. The axle holder supports both ends of the axle which passes through the front wheel between both axle holders.

In more detail, the axle is equipped with a large diameter part at one end and a small diameter part in line with the large diameter part. The tip end of the small diameter part forms a screw part and is fastened to an axle nut. A holder covers the large diameter part and the small diameter part from above with a freely removable cap fastened with bolts to the holder. Moreover, in this prior art device, the tip of the small diameter part is fastened directly to the holder and not by an axle nut. In addition to the above, another example includes an axle nut with a collar at both ends attached in position to a holder and clamped by a cap.

Furthermore, in addition to the cap method, a split clamp method includes a slot provided in the axle holder. After engaging the axle nut in the axle opening, the slot part is clamped and the axle nut is fastened.

According to the clamping construction of the aforesaid cap method, while it is possible to position the axle nut, since it is possible to use an axle nut with a collar provided on both ends, there is the possibility that the axle nut will fall out when the cap is removed during maintenance.

On the other hand, in the clamping construction of the split clamp method, while it is possible to prevent the axle nut from falling out, since the axle nut must be inserted from one side into the axle opening of the holder, it is not possible to provide a collar on the insertion side end. As a result, positioning is not possible. The object of the present invention is to simultaneously solve these various problems.

SUMMARY OF THE INVENTION

The object of the present invention is to provide an axle clamping device which solves the the aforesaid problems. The axle clamping device of the present invention includes a large diameter part at one end of the axle and a small diameter part forming a screw part at the other end of the axle. The large diameter part is clamped to an axle holder provided on one side of a pair of left and right front forks. An axle nut is fastened to the screw part of the small diameter part. The axle nut is clamped to an axle holder provided on the other front fork. In addition, the axle holder fastening the axle nut has a split clamp construction and the axle nut is provided with a cylindrical part which can be clamped by the axle holder. Both axial ends of the cylindrical part project from the axle holder, and a collar is provided on the periphery of one of the protruded ends. A peripheral groove is provided around the periphery of the other protruded end, and the axle nut is secured on the axle holder by a circlip engaging in the peripheral groove and by the aforesaid collar.

A collar is provided on one end of an axle nut fastened by a split clamp. Since a peripheral groove for a circlip has been provided on the periphery of the other end, the peripheral groove of the axle nut extends from the side where it is formed, through the axle opening, and out to the other side. By attaching the circlip to the peripheral groove, it is possible to locate the axial position of the axle nut with respect to the holder using this circlip and the collar of the other side.

Simultaneously, by using a split clamp holder, it is possible to prevent the axle nut from falling out during maintenance. It is also possible to reduce the number of parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more filly understood from the detailed description given hereinbelow and the accompanying drawings which are given by way of illustration only, and thus are not limitative of the present invention, and wherein:

FIG. 6 illustrates, in sequence, the shape from the collar side in an axial line and the shape from a direction orthogonal to the axle with a part of the outside removed.

DESCRIPTION OF THE PREFERRED EMBODIMENTS

Figure 1:
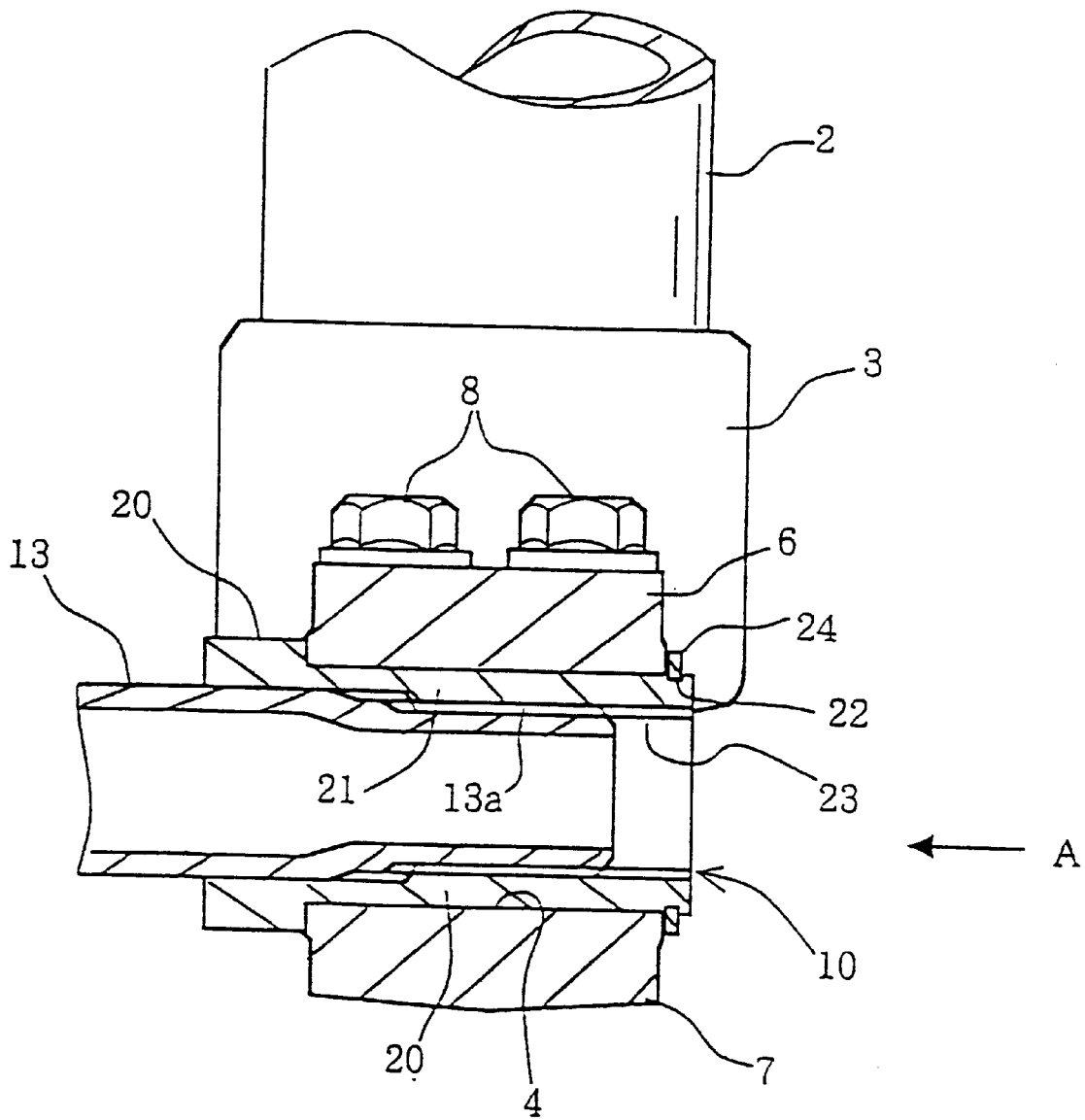
FIG. 1 is a cross sectional view illustrating the clamping structure on the axle nut side.
Figure 2:
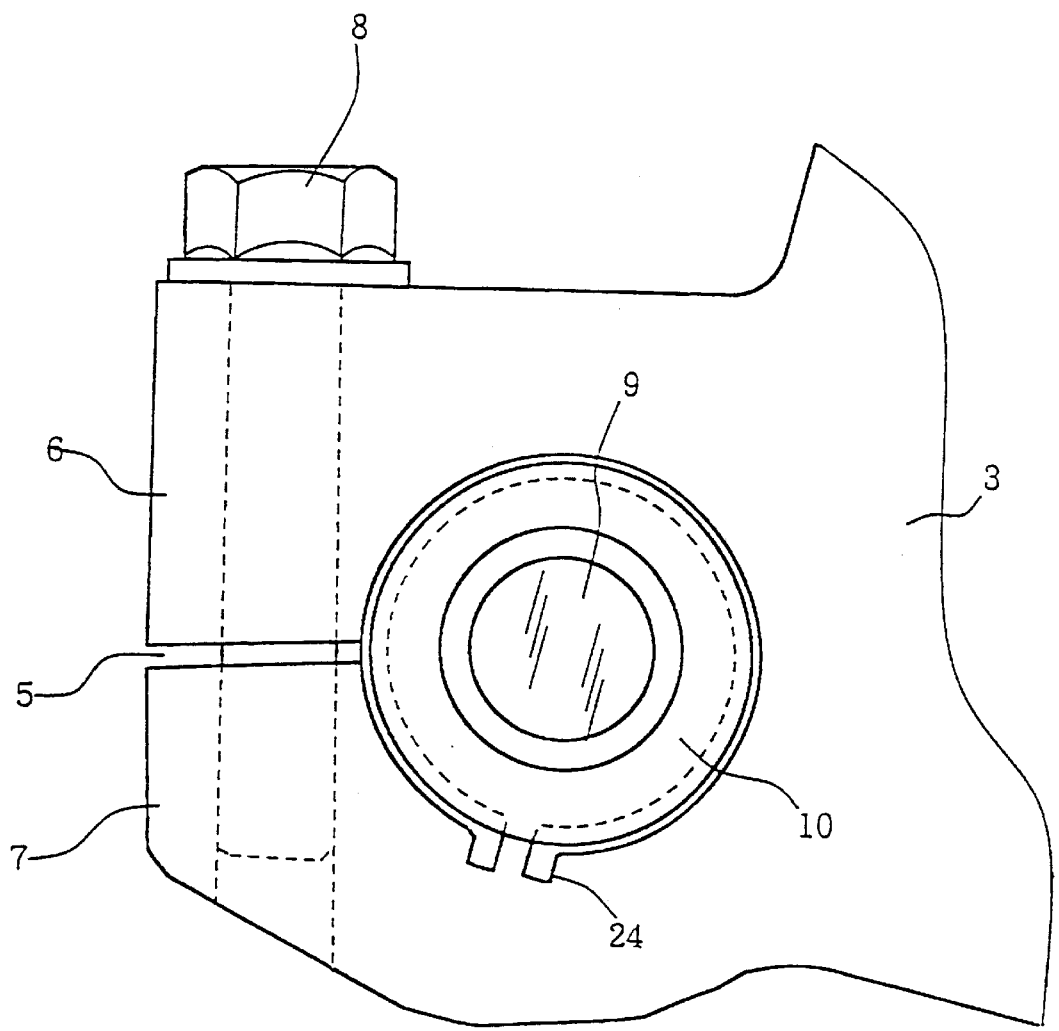
FIG. 2 is a view illustrating the clamping structure of the axle nut shown from the direction of arrow A of FIG. 1.

The present invention will now be described with reference to the accompanying drawings in which the same reference numerals are used to identify the same elements throughout the several views.

Figure 3:
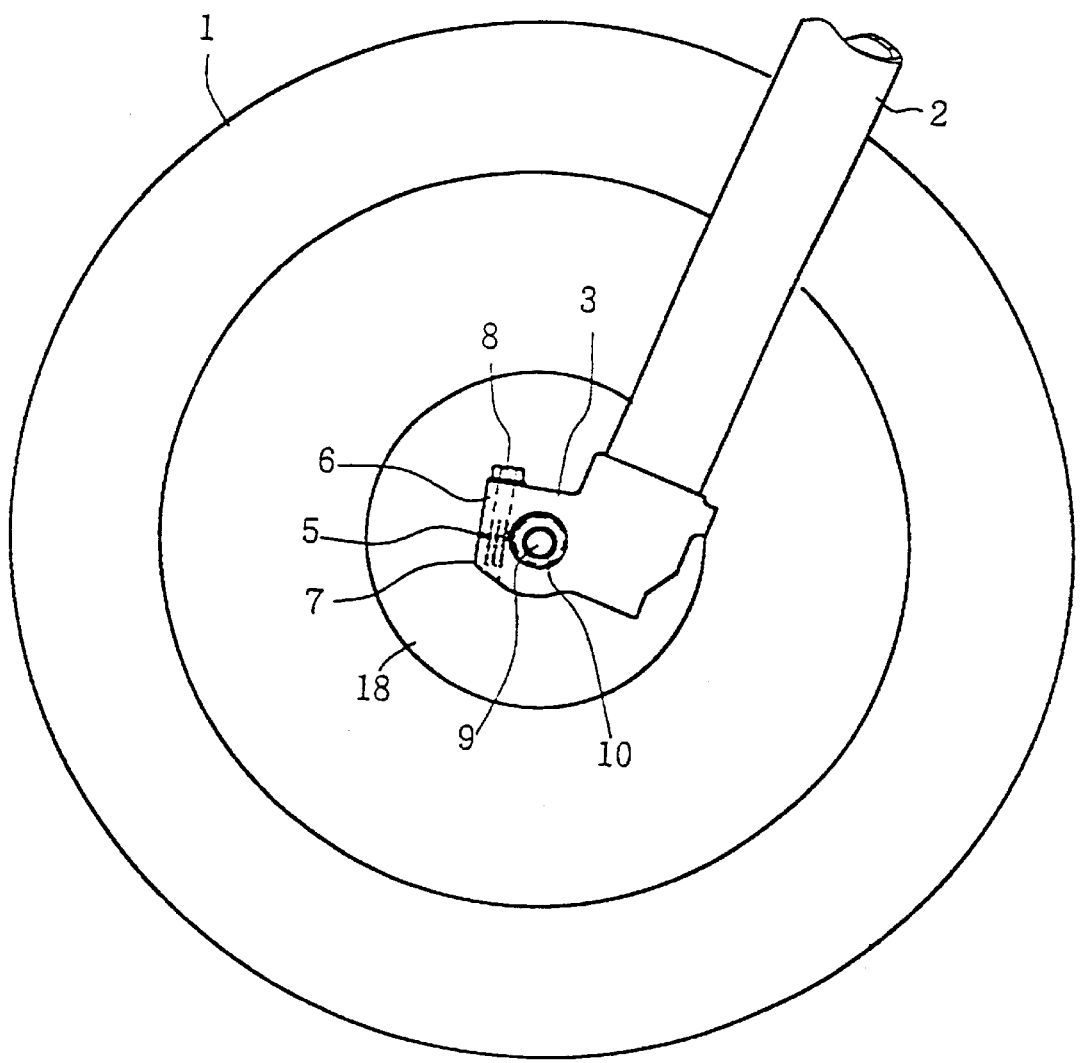
FIG. 3 is a side view of the front wheel part of a motorcycle to which the present embodiment is applied.

Referring first to FIG. 3, a pair of telescopic front forks 2 are provided on the left and right sides of a front wheel 1 of a motor cycle. A split clamp type axle holder 3 is provided on the lower ends of the front forks 2.

An axle opening 4 (FIG. 1) and a slot 5 formed in a radial direction to the opening 4 are provided on the axle holder 3. A pair of clamp parts 6 and 7 are separated from the slot 5 and are used to adjust the gap of the slot 5, by tightening a bolt 8.

Both ends of an axle 9 located in the axle opening 4, pass from left to right through the center of a hub 18 provided in the center of a front wheel 1. The ends of the axle 9 are fastened directly or via an axle nut 10.

Figure 5:
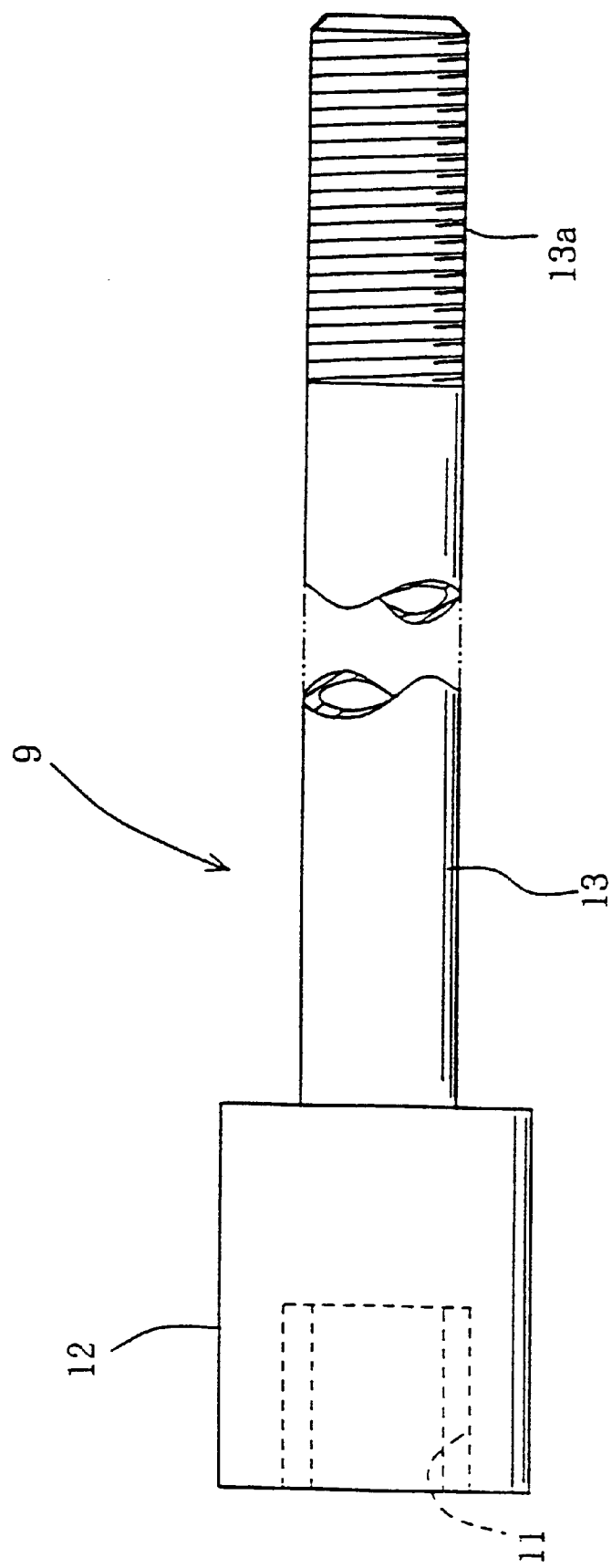
FIG. 5 is a view illustrating the shape of the axle.

As shown in FIG. 5, one end of the axle 9 has a large diameter part 12 formed by a hexagonal hole 11. The large diameter part 12 is clamped by a direct clamping method on one side of the pair of front forks 2 by the axle holder 3.

On the end of the axle 9 opposite the large diameter part 12, a small diameter part 13 is provided. A screw part 13*a* is provided around the periphery of a tip of the small diameter part 13. The small diameter part 13 is split clamped via the axle nut 10 on the axle holder 3 provided on the other front fork 2. Moreover, the diameters of the large diameter part 12 and the small diameter part 13 in FIG. 5 have been enlarged.

Figure 4:
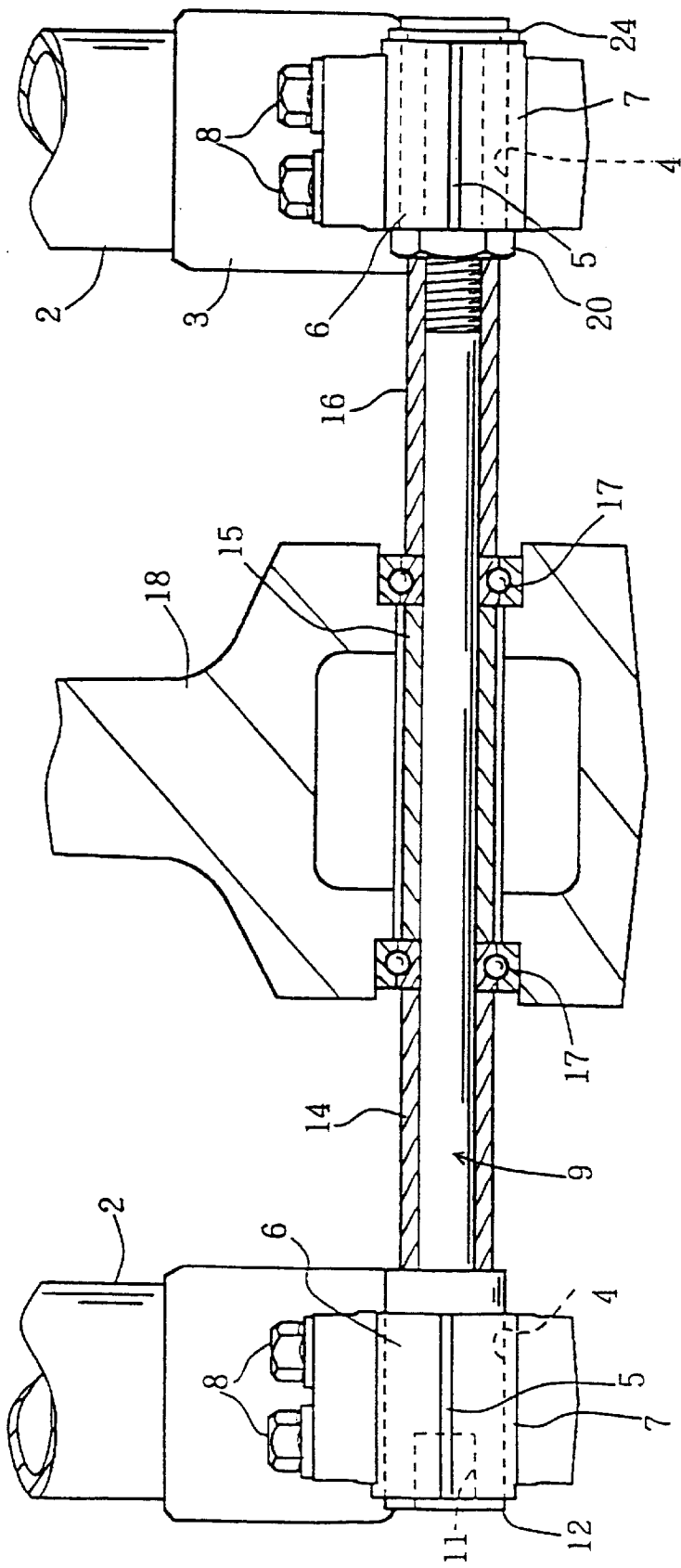
FIG. 4 is a diagram of an outline of the clamping construction of the axle shown parallel to the axle direction of the axle.

As shown in FIG. 4, the axle 9 passes through the hub 18 of the front wheel 1 in a left to right direction. The hub 18 is supported for rotation by a bearing 17 located by collars 14, 15 and 16 engaged with the outer periphery of the axle 9.

Figure 6:
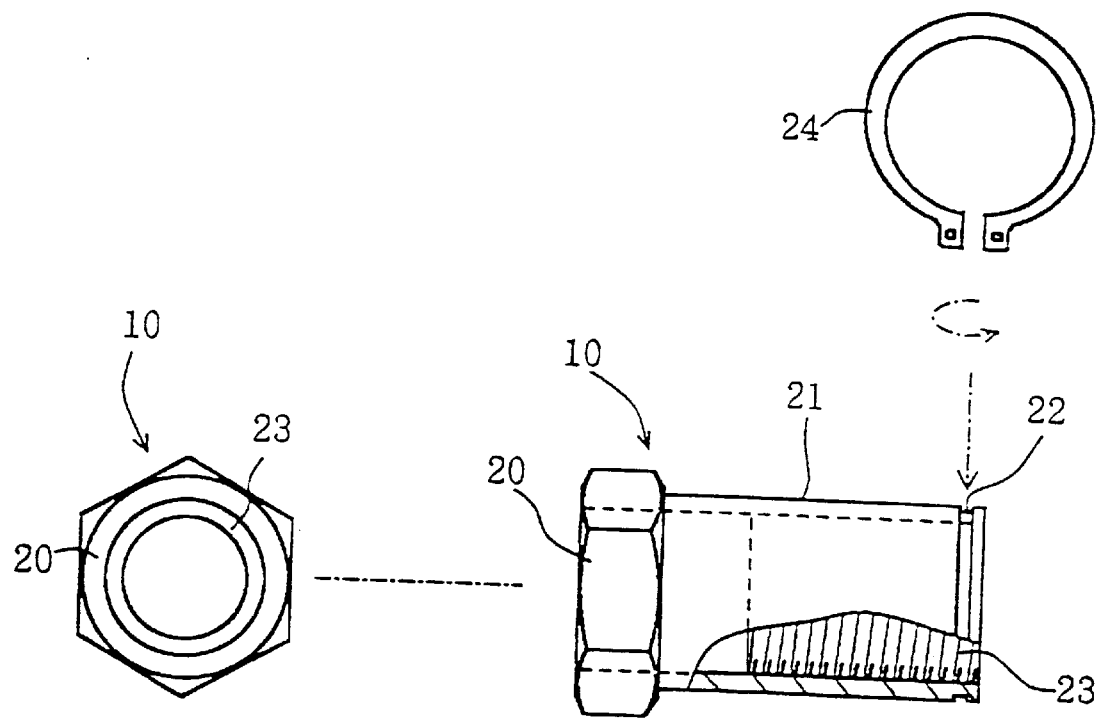
FIG. 6 is a view illustrating the details of the axle nut.

As made clear by FIG. 6, one end of the axle nut 10 is formed by a hexagonal shaped collar 20. A peripheral groove 22 is formed around the periphery of the other end of the axle nut 10. The central part of the axle nut 10 includes a cylindrical part 21 with a length equal to the length of the axle opening 4. A screw part 23 is formed on the inner peripheral surface of the axle nut 10. The screw part 23 is formed so that the screw part 13a formed on the outer periphery of the tip of the small diameter part 13 connects with this screw part 23.

The collar 20 and the peripheral groove 22 protrude outwards from the axle holder 3. When the collar 20 comes into contact with the surface of one side of the axle holder 3, by engaging a circlip 24 in the peripheral groove 22, the other side surface of the axle holder 3 comes into proper position with the axlenut 10.

The operation of the present embodiments will now be described. First, as shown in FIG. 1, the side of the axle nut 10 formed with the peripheral groove 22 is inserted into the shaft hole 4 of the axle holder 3. When the circlip 24 is engaged in the peripheral groove 22 protruding from the other end of the axle holder 3, the collar 20 and the circlip 24 of both ends of the axle nut 10 connect with side surfaces of the axle holder 3. Therefore, the axle nut 10 is properly positioned in the axial direction.

On the axle holder 3 formed on the other front fork 2, the tip of the small diameter part 13 of the axle 9 already supported by the large diameter part 12 is screwed into axle nut 10. If the large diameter part 12 of the axle 9 and the cylindrical part 21 of axle nut 10 are split clamped with each bolt 8, the clamping of the axle 9 is complete.

Since split clamping has been employed, the risk of the axle nut 10 falling out is alleviated and handling during maintenance is improved. At the same time, despite employing split clamping, it is possible to properly position the axle nut 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An axle fastening device for clamping an axle on an axle holder of a motorcycle, the axle provided with a large diameter part at one end and a small diameter part on the other end, the small diameter part including a screw part formed thereon, the large diameter part is for being fastened to a first axle holder provided on one side of a pair of left and right front forks, said axle fastening device comprising:

a second axle holder provided on the other of the pair of left and right forks;

an axle nut for fastening to the screw part of the small diameter part of the axle, said axle nut including:

a cylindrical part having two axial ends, said cylindrical part for being clamped by said second axle holder, said axial ends of said axle nut project from said second axle holder when said axle nut is inserted within said second axle holder;

a collar provided on a periphery of one of the projected ends of the axle nut; and a peripheral groove is provided around a periphery of the other projected end; and a fastener for locating the axle nut on the axle holder by engaging in the peripheral groove.

2. The axle fastening device for clamping an axle on an axle holder of a motorcycle according to claim 1, wherein said axle nut further includes:

an axial hole extending through said collar and said cylindrical part; and a screw part formed in said axial hole on said cylindrical part for threading with the screw part of the axle.

3. The axle fastening device for clamping an axle on an axle holder of a motorcycle according to claim 1, wherein said fastener is a circlip.

4. The axle fastening device for clamping an axle on an axle holder of a motorcycle according to claim 1, wherein said collar is formed integral with said cylindrical part, said collar is in the shape of a hexagonal bolt.

5. The axle fastening device for clamping an axle on an axle holder of a motorcycle according to claim 1, wherein said second axle holder includes a first portion for engaging with said other of said pair of left and right forks and a second portion of split clamp construction for engaging with said cylindrical part of said axle nut.

6. The axle fastening device for clamping an axle on an axle holder of a motorcycle according to claim 5, wherein said second axle holder includes at least one bolt for clamping said second portion around said cylindrical part.

7. The axle fastening device for clamping an axle on an axle holder of a motorcycle according to claim 6, wherein said collar engages a first, inner side of said second axle holder and said fastener engages a second, outer side of said second axle holder to properly position the axle nut within the second axle holder.

8. A motorcycle comprising:

an axle provided with a large diameter part at one end and a small diameter part on the other end, the small diameter part including a screw part formed thereon;

a first axle holder provided on one side of a pair of left and right front forks, the large diameter part of said axle is fastened to said first axle holder;

a second axle holder provided on the other of the pair of left and right forks;

an axle nut fastened to the screw part of the small diameter part of the axle, said axle nut including:

a cylindrical part having two axial ends, said cylindrical being clamped by said second axle holder, said axial ends of said axle nut project from said second axle holder when said axle nut is inserted within said second axle holder;

a collar provided on a periphery of one of the projected ends of the axlenut; and a peripheral groove is provided around a periphery of the other projected end; and a fastener for locating the axle nut on the axle holder by engaging in the peripheral groove.

9. The motorcycle according to claim 8, wherein said axle nut further includes:

an axial hole extending through said collar and said cylindrical part; and a screw part formed in said axial hole on said cylindrical part for threading with the screw part of the axle.

10. The motorcycle according to claim 8, wherein said fastener is a circlip.

11. The motorcycle according to claim 8, wherein said collar is formed integral with said cylindrical part, said collar is in the shape of a hexagonal bolt.

12. The motorcycle according to claim 8, wherein said second axle holder includes a first portion for engaging with said other of said pair of left and right forks and a second portion of split clamp construction for engaging with said cylindrical part of said axle nut.

13. The motorcycle according to claim 12, wherein said second axle holder includes at least one bolt for clamping said second portion around said cylindrical part.

14. The motorcycle according to claim 13, wherein said collar engages a first, inner side of said second axle holder and said fastener engages a second, outer side of said second axle holder to properly position the axle nut within the second axle holder.

15. A front axle clamping device for a motorcycle comprising:

a front axle having a large diameter part and a small diameter part for being inserted into a front wheel of the motorcycle;

a collar interlockingly fixed to the small diameter part; and a clamping part for fastening the collar to a front fork of the motorcycle;

wherein said small diameter part is properly secured to the front fork.

16. The front axle clamping device for a motorcycle according to claim 15, wherein said collar further includes:

a cylindrical part formed thereon;

an axial hole extending through said cylindrical part; and a screw part formed in said axial hole on said cylindrical part for threading with the screw part of the axle.

17. The front axle clamping device for a motorcycle according to claim 15, wherein said collar is in the shape of a hexagonal bolt.

18. The front axle clamping device for a motorcycle according to claim 15, wherein said clamping part includes a first portion for engaging with the front fork and a second portion of split clamp construction for engaging with said cylindrical part.

19. The front axle clamping device for a motorcycle according to claim 18, wherein said clamping part includes at least one bolt for clamping said second portion around said cylindrical part.

20. The front axle clamping device for a motorcycle according to claim 19, wherein said collar engages a first, inner side of said clamping part, said cylindrical part includes a peripheral groove for receiving a fastener therein, said fastener engages a second, outer side of said clamping part to properly position the small diameter part of the axle within the clamping part.

* * * * *